Oct. 18, 1960    E. C. GIBSON    2,956,463
HELICAL SPRING SLEEVE FOR LATHES
Original Filed Jan. 18, 1954
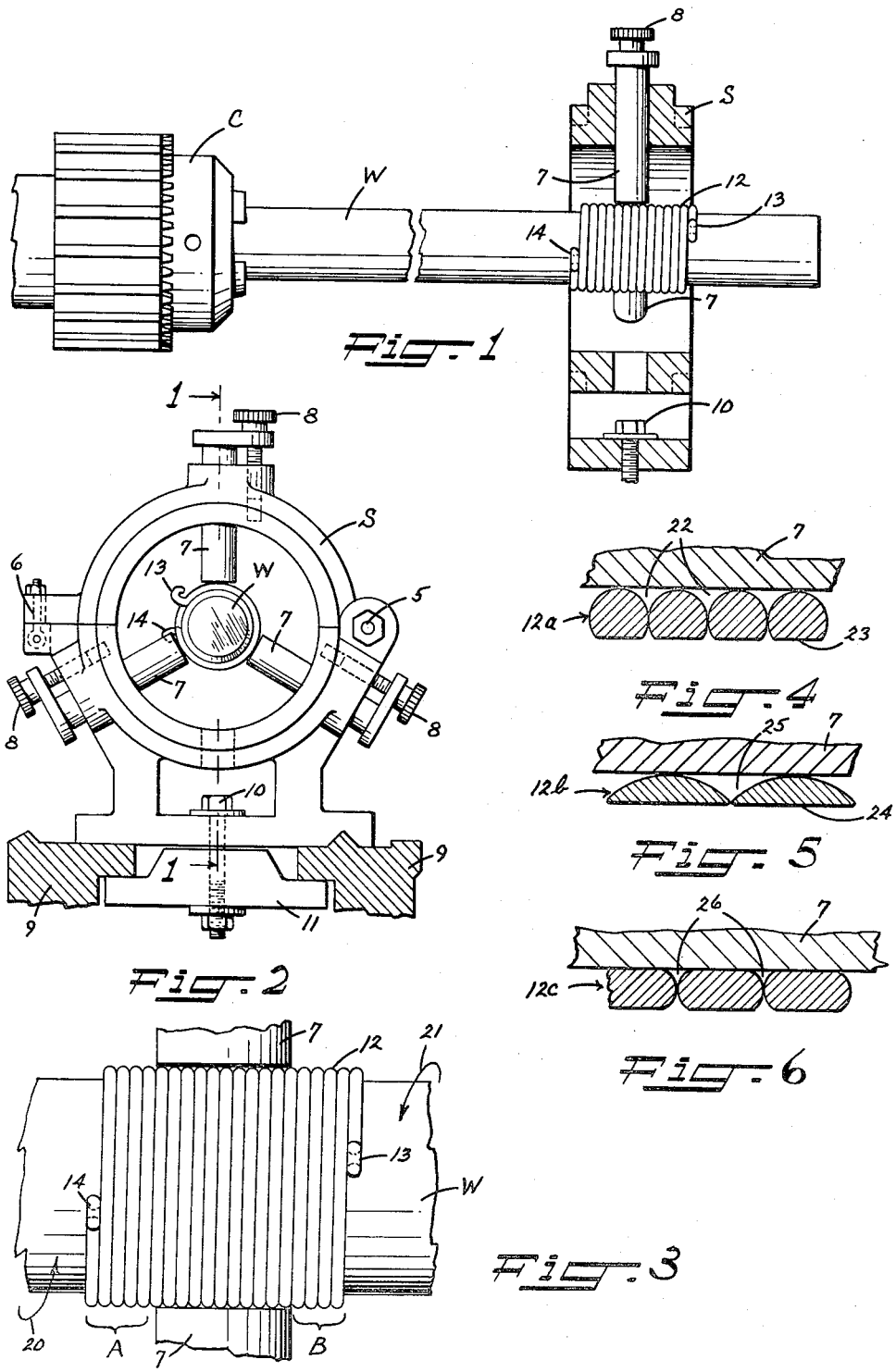

United States Patent Office 2,956,463
Patented Oct. 18, 1960

2,956,463

HELICAL SPRING SLEEVE FOR LATHES

Eugene C. Gibson, Bon Air, Pa., assignor to American Viscose Corporation, Philadelphia, Pa., a corporation of Delaware Continuation of abandoned application Ser. No. 404,424, Jan. 18, 1954. This application Jan. 9, 1957, Ser. No. 633,255

13 Claims. (Cl. 82—39)

This invention relates to a protective sleeve or covering for a work-piece and is particularly suited for use with machine tools such as lathes.

The present invention is a continuation of my copending application Serial No. 404,424 filed January 18, 1954, now abandoned, which copending application was a continuation-in-part of my copending application Serial No. 68,352, filed December 30, 1948, now abandoned.

I have found that it is extremely difficult to turn or otherwise machine work-pieces in a lathe where the work-piece is of sufficient length to necessitate the use of a steady rest. Ordinarily, the steady rest is secured to the ways of the lathe bed and the jaws of the steady rest directly contact the surface of the work-piece. However, where the work-piece is of a very delicate nature, or an extremely thin-wall tube, or if the surface of the work-piece is highly polished, it has been found impossible to turn the piece in the steady rest jaws without scratching or otherwise marring the finish which may be required.

The present invention has for its principal object the provision of a protective sleeve or covering for the work-piece which can be used in the steady rest and which will not mar the surface of the work-piece.

A further object of the invention is to provide a protective sleeve for a rotating work-piece which grips the periphery of the work-piece with sufficient force to prevent turning of the sleeve with respect to the work-piece but which also can be applied to the work-piece without the necessity for driving the sleeve onto the work-piece or otherwise marring the same.

A further object of the invention is to provide a helical spring protective cover for a work-piece which is self-tightening when turned in either direction in the jaws of a steady rest.

A further object is to provide in a device of the class described, suitable means for installing and removing the cover or sleeve without scratching the surface of the work-piece.

Further objects will be apparent from the specification and drawings in which:

Figure 1 is a view partly sectioned along the line I—I of Figure 2 showing the protective covering of the present invention as used in a lathe steady rest;

Figure 2 is an end view of the structure of Figure 1 showing in addition a fragmentary section of the lathe bed;

Figure 3 is an enlarged detail of the self-locking sleeve illustrating the manner in which the self-locking feature is achieved;

Figures 4–6 are highly enlarged cross-sectional views showing various forms which may be employed in fabricating the helical sleeve.

The invention comprises essentially the provision of a helical spring wound of tempered steel wire, preferably music wire, the inside diameter of which is sufficient to lightly grip the periphery of a work-piece. The length of the sleeve is sufficiently greater than the width of the jaws of the steady rest, or the other support in which the sleeve is mounted, to permit several free turns around the work-piece in an axial direction trailing that of the rotation of the work-piece. By using a round wire for the work-piece or a wire having a helical groove of some configuration, the ability to lubricate the sleeve in the steady rest is greatly enhanced.

Referring now more particularly to the drawings, a work-piece W which is of a round shape and may be a highly polished bar, tube, or sleeve of either metal or a synthetic plastic material such as Bakelite or methyl methacrylate is clamped in a conventional chuck C of a lathe or drill press. When used in a lathe, it may be desirable or necessary to support the outer end of the work-piece W in a steady rest S which, as shown, is of conventional construction. In the present instance, the steady rest S is split horizontally, the upper half being hinged at 5 and clamped at 6 to permit easy set-up in the machine. The steady rest is provided with three jaws 7, 7 which are readily adjustable in the steady rest by means of thumb screws 8, 8. The base of the steady rest is slidable on the ways 9, 9 of the lathe bed and the entire assembly may be securely fixed to the bed by means of bolt 10 and gib 11.

The protective sleeve 12 is formed in the showing of Figures 1 and 3 of a plurality of turns of music wire, each end being bent up at 13 and 14 to provide two ears that are axially spaced a substantial distance from each other. Preferably, the protective sleeve is centered on the work-piece with respect to the jaws 7, 7 of the steady rest. This, however, is not strictly necessary provided there are enough "trailing" turns of the covering extending to one side of the jaws. Whether the trailing turns will be to the right or to the left of the jaws as seen in Figure 1 depends upon the direction of rotation of the work-piece and whether the covering is wound right or left hand. This feature will be explained more fully in connection with Figure 3. As installed in Figure 1, there is ample clearance for turning of the work-piece without interference between the ears 13 and 14 and the jaws 7, and I have shown approximately four to five turns of the helical spring extending on either side of the jaws to accomplish this result.

The particular advantage to be derived in the present invention is achieved by the use of a covering which can be installed on the work-piece simply by expanding the covering to permit sliding it axially to the desired position. This expansion is achieved by twisting ears 13 and 14 in a direction opposite to the coil of the spring. More accurately, this might be termed "untwisting the spring." With proper selection of spring strength and wire size and inside diameter of the spring, it is possible to position the spring on the work-piece without any scratching or marring of the surface. Because of the self-locking feature, it is not necessary to provide an initial snug fit between the spring and the work-piece to prevent relative turning therebetween. Obviously, if the protective sleeve is driven onto the work-piece or otherwise tightly clamped, it would be entirely possible to prevent such relative rotation. No previously known device, however, can be installed on the work-piece to provide an absolutely round outer surface and at the same time grip the surface of the work-piece tightly enough to prevent rotation between the work-piece and the covering without marring the surface of the work-piece.

With the spring installed in such a manner that there are free turns extending beyond the jaws of the steady rest, it is possible to rotate the work-piece in either direction without danger of the sleeve turning on the work-piece. This feature is more clearly illustrated in Figure 3. Assuming that the work-piece W is turned in the direction of the arrow 20, the tangential component of the frictional force exerted by the jaws 7, 7 then tends to loosen or untwist the free turns included in the bracket A. This is because the particular winding of spring 12 is left hand. Similarly, the free turns included in the bracket B are tightened or contracted because this direction of rotation with a left hand spring tends to decrease the spring coil diameter, thus causing the spring turns to grip the surface of the work-piece very tightly provided there is a sufficient number of trailing turns which in effect are gripping turns rather than expanding turns. This gripping action is very effective and completely locks the sleeve on the work-piece. Relatively little friction is required to achieve this locking action but it will be understood there is some relationship between the friction and number of trailing turns. In other words, the more trailing turns are used, the less is the need for initial frictional contact between the trailing turns and the work-piece so that even a very light wire of a diameter equal to or slightly in excess of the outside diameter of the work-piece could be used. Conversely, as the number of turns and the rigidity of the wire decrease, sufficient frictional contact between the free trailing turns and the work-piece must be present to initiate the contracting or locking action of the free trailing turns.

If, however, the work-piece W is rotated in the opposite direction as shown by the arrow 21, then the trailing turns are the ones included in bracket A, whereas the leading or expanding turns are indicated by the bracket B so that the same result is achieved but in this case due to the contracting action of free turns "A" instead of free turns "B." The exact action which takes place in the turns of the spring directly contacted by the jaws 7, 7 is quite complex and no reason is seen to attempt the explanation thereof. Since steady rests customarily employ three jaws located 120° apart, it may be assumed that there is little, if any, chance for the spring turns to expand or contract directly underneath the jaws. Whether one or more than one of the free trailing turns acts as an "anchor" turn to initiate the gripping action is inconsequential. Obviously greater gripping or clamping is achieved if the outermost turn is the anchor turn but all of the trailing turns may have sufficient frictional contact with the work-piece to provide the self-locking feature.

It will, of course, be understood that with the direction of rotation of the work-piece remaining the same, it is not necessary to provide any leading turns at all so that if the work-piece W always turns in the direction of the arrow 21, as would ordinarily be the case, the spring covering 12 could be moved axially to the left in Figure 3 so long as ear 13 clears the jaws 7. This would provide even greater self-locking action due to the increased number of trailing turns in section A but might not be effective to prevent rotation between the work-piece and the spring should the direction be reversed.

Depending on the nature and strength of the work-piece W, various modified shapes for the spring wire may be employed such as shown in Figures 4–6. A modified spring or cover 12a is shown in Figure 4 in which the wire turns provide a helical lubricant passage 22 on the outside, and on the inside they are slightly flattened at 23. This construction, of course, provides somewhat increased frictional contact between the bore of the spring and the surface of the work-piece. A spring 12b having even greater contact area with the work-piece is shown in Figure 5 in which the radius of the outer surface of the spring wire is considerably greater, but each turn is in effect only a segment of the complete circular cross-section. This form provides a substantially unbroken flat surface 24 in contact with the work-piece. In this construction, however, the lubricant passage 25 is of considerably greater capacity. A still further modified form of spring cover 12c is shown in Figure 6 in which the spring wire is flattened both inside and outside. Here there is a maximum contact area both with respect to the work-piece and the jaw 7, and the lubricant groove 26 is relatively smaller in capacity. The desirability of the grooves or groove on the outer periphery of the spring are in direct relation to the necessity for introducing lubricant between the outside of the spring and the jaws. It will be obvious that the wiping action of the jaws tends to carry lubricant around through the grooves which, together with the action of gravity, provides a most effective means of maintaining adequate lubrication.

It will thus be understood that I have provided an extremely simple and effective means for protecting the surface of a delicate or highly polished work-piece during a machining operation. Heretofore it has been impossible to use a steady rest whatsoever on such a device, thus necessitating the employment of expensive and complicated fixtures.

Having thus described my invention, I claim:

1. In combination, a round work-piece, a stationary support for the work-piece, a helically wound sleeve surrounding the work-piece at the support and against which the support bears, and at least one anchor turn on the sleeve which turn is located axially beyond the support to initiate contraction of a plurality of succeeding turns of the sleeve around the periphery of the work-piece and non-rotatable engagement therebetween.

2. In combination, a round work-piece, means for turning said work-piece about its axis, a stationary support for the work-piece in spaced relation to the turning means, a helically wound sleeve surrounding the work-piece at the support and against which the support bears, and at least one anchor turn on the sleeve which turn is located axially beyond the support to initiate contraction of a plurality of succeeding turns of the sleeve around the periphery of the work-piece and non-rotatable engagement therebetween.

3. In combination, a round work-piece, a stationary support for the work-piece, a helically wound sleeve surrounding the work-piece at the support and against which the support bears, at least one anchor turn on the sleeve which turn is located axially beyond the support to initiate contraction of a plurality of succeeding turns of the sleeve around the periphery of the work-piece and non-rotatable engagement therebetween, and means for manually expanding the sleeve.

4. The combination of claim 3 in which the means for manually expanding the sleeve comprises an ear formed at each end of the sleeve.

5. The combination of claim 4 in which the bore of the sleeve is flattened.

6. In combination, a round work-piece, means for turning said work-piece about its axis, a stationary support for the work-piece in spaced relation to the turning means, a helically wound sleeve surrounding the work-piece at the support and against which the support bears, at least one anchor turn on the sleeve located axially beyond the support to initiate contraction of a plurality of succeeding turns of the sleeve around the periphery of the work-piece and non-rotatable engagement therebetween, and means for manually expanding the sleeve.

7. The combination of claim 6 in which the means for manually expanding the sleeve comprises an ear formed at each end of the sleeve.

8. The combination of claim 7 in which the bore of the sleeve is flattened.

9. In combination, a round work-piece having a polished surface, means for turning said work-piece about its axis, a stationary support for the work-piece in spaced relation to the turning means, a plurality of work-piece engaging jaws in said support, said jaws having a fixed axial width, and a helical sleeve wrapped around the work-piece in line with said jaws, which sleeve lightly grips the work-piece, the axial length of the sleeve being substantially larger than the width of the jaws.

10. In combination, a round work-piece having a polished surface, means for turning said work-piece about its axis, a stationary support for the work-piece in spaced relation to the turning means, a plurality of work-piece engaging jaws in said support, said jaws having a fixed axial width, and a helical sleeve wrapped around the work-piece in line with said jaws which sleeve lightly grips the work-piece, a plurality of turns of said sleeve extending beyond both sides of the jaws.

11. A self-locking protective sleeve for round work-pieces and the like which are mounted in a stationary support during a machining operation comprising a helical resilient spring wrapped lightly around the work-piece in alignment with the support, the axial length of the spring being substantially greater than the axial length of the support.

12. A self-locking protective sleeve for round work-pieces and the like which are mounted in a stationary support during a machining operation comprising a helical resilient spring wrapped lightly around the work-piece in alignment with the support, the axial length of the spring being substantially greater than the axial length of the support, and an anchor turn near one end of the spring to provide a point from which the spring is clamped to the work-piece due to the turning pressure component of the work-piece in the support.

13. Apparatus in accordance with claim 12 in which each end of the sleeve is provided with a radially extending ear.

References Cited in the file of this patent

UNITED STATES PATENTS

| | | |
|---|---|---|
| 113,380 | Wilson | Apr. 4, 1871 |
| 268,194 | Cunningham | Nov. 28, 1882 |
| 338,291 | O'Neill | Mar. 23, 1886 |
| 467,341 | Cole | Jan. 19, 1892 |
| 1,454,682 | Layne | May 8, 1923 |
| 1,767,153 | Pfaff | June 24, 1930 |